US007929772B2

(12) United States Patent
Tsai et al.

(10) Patent No.: US 7,929,772 B2
(45) Date of Patent: Apr. 19, 2011

(54) METHOD FOR GENERATING TYPOGRAPHICAL LINE

(75) Inventors: Wen-Hann Tsai, Taipei (TW); Hsin-Te Lue, Taipei (TW)

(73) Assignee: Compal Electronics Inc., Taipei (TW)

( * ) Notice: Subject to any disclaimer, the term of this patent is extended or adjusted under 35 U.S.C. 154(b) by 965 days.

(21) Appl. No.: 11/768,916

(22) Filed: Jun. 27, 2007

(65) Prior Publication Data
US 2008/0131000 A1 Jun. 5, 2008

(30) Foreign Application Priority Data

Dec. 1, 2006 (TW) ............................... 95144629 A

(51) Int. Cl.
G06K 9/00 (2006.01)
G06K 9/46 (2006.01)
G06K 9/48 (2006.01)
G06K 9/50 (2006.01)
G06K 9/66 (2006.01)

(52) U.S. Cl. ........ 382/190; 382/181; 382/195; 382/198; 382/199; 382/200; 382/201

(58) Field of Classification Search .................. None
See application file for complete search history.

(56) References Cited

U.S. PATENT DOCUMENTS

| | | | | | |
|---|---|---|---|---|---|
| 4,878,248 | A | * | 10/1989 | Shyu et al. | 382/105 |
| 4,998,285 | A | * | 3/1991 | Suzuki et al. | 382/171 |
| 5,321,770 | A | * | 6/1994 | Huttenlocher et al. | 382/174 |
| 5,438,630 | A | * | 8/1995 | Chen et al. | 382/159 |
| 5,706,364 | A | * | 1/1998 | Kopec et al. | 382/159 |
| 5,999,647 | A | * | 12/1999 | Nakao et al. | 382/187 |
| 7,302,098 | B2 | * | 11/2007 | Tang et al. | 382/177 |
| 7,362,901 | B2 | * | 4/2008 | Walch | 382/199 |
| 7,430,065 | B2 | * | 9/2008 | Arakai et al. | 358/3.26 |

OTHER PUBLICATIONS

Min-Chul Jung; Yong-Chul Shin; Srihari, S.N.; "Machine printed character segmentation method using side profiles", 1999 IEEE International Conference on Systems, Man, and Cybernetics, 1999. pp. 863-867 vol. 6.*
Zramdini et al. "Optical font recognition using typographical features", IEEE Transactions on Pattern Analysis and Machine Intelligence, vol. 20 , Issue: 8, 1998 , pp. 877-882.*
Kahan, Simon; Pavlidis, Theo; Baird, Henry S.; "On the Recognition of Printed Characters of Any Font and Size", IEEE Transactions on Pattern Analysis and Machine Intelligence, vol. PAMI-9 , Issue: 2, 1987 , pp. 274-288.*
Min-Chul Jung; Yong-Chul Shin; Srihari, S.N.; "Multifont classification using typographical attributes", Proceedings of the Fifth International Conference on Document Analysis and Recognition, 1999. ICDAR '99. pp. 353-356.*

* cited by examiner

*Primary Examiner* — Samir A Ahmed
*Assistant Examiner* — Li Liu
(74) *Attorney, Agent, or Firm* — Jianq Chyun IP Office

(57) ABSTRACT

A method for generating typographical line is provided. In the present method, an asymptote of an upper or a lower edge of a line of printing words is obtained first. Then, two typographical lines of the other edge of the line of printing words are obtained according to the asymptote. Two typographical lines of the present edge of the line of printing words are obtained based on the previously obtained typographical lines. Finally, the relations of these typographical lines and edge reference points of the line of printing words are used for removing useless typographical lines. Therefore, the typographical lines obtained by the present invention can provide the means of recognizing word direction, large or small character writing, and punctuation marks, so as to increase the efficiency and accuracy of character recognition.

15 Claims, 6 Drawing Sheets

METHOD FOR GENERATING TYPOGRAPHICAL LINE

CROSS-REFERENCE TO RELATED APPLICATION

This application claims the priority benefit of Taiwan application serial no. 95144629, filed Dec. 1, 2006. All disclosure of the Taiwan application is incorporated herein by reference.

BACKGROUND OF THE INVENTION

1. Field of the Invention

The present invention generally relates to a character recognition method, more particularly, to a method for generating typographical line of English language words.

2. Description of Related Art

In this information explosion era, ordinary people frequently have to read vast quantities of books, newspapers or journals. When some valuable sections or important points are found in an article, they are filed by photocopying or cut editing or directly labelled with a pen. However, for a person who works frequently on words, any data in an article that are useful must first be input into a computer by a key-in process before the data can be subsequently edited or filed. Therefore, a lot of time and labor is wasted.

To resolve this problem, optical recognition techniques have been developed so that useful documents can be scanned into graphical files through a common scanner and then characters in the graphical file can be extracted using character recognition software and converted into corresponding digital characters. As a result, the user can quickly obtain an electronic file of the document for editing or processing. At present, the scope of applications of optical recognition techniques is wide-spread. For example, the filing of literary data of a library, the management of internal documents of an enterprise, the recognition of identity cards and receipts and so on can be easily achieved by using the optical recognition technique. Therefore, not only the data can be accurately recognized, a lot of time and labor for comparing and verifying data can also be saved.

Optical character recognition, commonly shortened to OCR, is mainly used for recognizing the characters of an existing paper document. First, the document to be recognized has to be scanned into a graphical file using a flatbed or a palmtop scanner. Due to dirt on the document, blurs of the characters or resolution of the scanner, some noise may exist in the input image and affect the accuracy of subsequent character recognition. Therefore, the OCR software has to perform tilt correction, noise removal, and image edge sharpening of the graphical file of the scanned document first. Next, the OCR software takes action to separate the graph and the words in the processed graphical file so that the words, graphs and tables in the document are all separated and some of the characters without a clear connection are correctly cut or combined. Thereafter, the OCR software performs a document recognition process by comparing a graphical image of the characters with characters in a database. At the same time, an accurate result of the recognition is output after recognizing phrases and related words through a corrective function. The recognized characters can be directly saved in a Word, PDF or pure text format file. As a result, not only the loading of data input can be reduced, but the speed and accuracy of data input can also be increased.

However, some problems still exist in the current OCR software. These problems often lead to errors in character recognition or failure of recognition and cause much inconvenience to the user. For example, the scan document may be inappropriately positioned so that the scanned graphical file is tilted, inverted (horizontally shifted) or ratio distorted (vertically shifted). Alternatively, when the sizes of a character are different but the shapes are the same, large and small character writing are not recognized and punctuation marks, which have a small character shape, are also difficult to be recognized.

SUMMARY OF THE INVENTION

Accordingly, the present invention is directed to a method for generating typographical line. By obtaining a plurality of typographical lines of a line of printing words, the typographical lines can be used for determining word direction, large and small character writing, punctuation marks and correcting the tilt of word image in subsequent character recognition operations.

According to an embodiment of the present invention, a method for generating typographical lines is provided. The method is suitable for generating a plurality of typographical lines of a line of printing words. The line of printing words includes a plurality of printed characters. The method includes the following steps: (a) the line of printing words is scanned and a first edge and a second edge of each printing character in the line of printing words are labeled; (b) a first edge reference point of the first edge and a second edge reference point of the second edge of each printing character are extracted; (c) a least square method is used to obtain a first straight line asymptotic to the first edge reference points; (d) the first straight line is used as a first base line to calculate the vertical distances between each second edge reference point and this first base line; (e) according to the vertical distances calculated with respect to each of the second edge reference points, the second edge reference points are separated into a first group and a second group using a group converging algorithm; (f) the least square method is used to obtain a second straight line asymptotic to the first group of second edge reference points and a third straight line asymptotic to the second group of second edge reference points; (g) the second straight line or the third straight line obtained from the corresponding first group or the second group that has the greater number of second edge reference points is used as a second base line to calculate the vertical distances between each first edge reference point and the second base line; (h) according to the vertical distances calculated with respect to each of the first edge reference points, the first edge reference points are separated into a third group and a fourth group using a group converging algorithm; (i) the least square method is used to obtain a fourth straight line asymptotic to the third group of the first edge reference points and a fifth straight line asymptotic to the fourth group of the first edge reference points; and (j) the second straight line, the third straight line, the fourth straight line and the fifth straight line are used as the typographical lines of the line of printing words.

In an embodiment of the present invention, after the step (a), further includes: (a1) a main direction of the line of printing words is recognized and adjusted, wherein the main direction includes either a horizontal direction or a vertical direction.

In an embodiment of the present invention, after the step (a), further includes: (a2) the height of each printing character is calculated; (a3) the character height of each printing character is compared with a preset height, and the printing characters having a character height smaller than the preset height are classified as small characters.

In an embodiment of the present invention, after the step (a3), further includes: (a4) a central reference point of the center of each remaining printing character is extracted; (a5) the least square method is used to obtain a center line asymptotic to the central reference points; (a6) the lower edge of each printing character is determined whether above the center line, and those printing characters having their lower edges above the center line are classified as small characters; and, (a7) the upper edge of each printing character is determined whether below the center line, and those printing characters having their upper edges below the center line are classified as small characters.

In an embodiment of the present invention, the small characters are not listed as reference for generating the typographical lines.

In an embodiment of the present invention, the step (f) includes: whether the number of second edge reference points in the first group or the second group is 1 is determined, if the number of second edge reference points in the first group is 1, the third straight line asymptotic to the second edge reference points of the second group is parallel-shifted to the second edge reference point of the first group as the second straight line; if the number of second edge reference points in the second group is 1, the second straight line asymptotic to the second edge reference points of the first group is parallel-shifted to the second edge reference point of the second group as the third straight line.

In an embodiment of the present invention, the step (i) includes: whether the number of first edge reference points in the third group or the fourth group is 1 is determined, if the number of first edge reference points in the third group is 1, the fifth straight line asymptotic to the first edge reference points of the fourth group is parallel-shifted to the first edge reference point of the third group as the fourth straight line; if the number of first edge reference points in the fourth group is 1, the fourth straight line asymptotic to the first edge reference points of the third group is parallel-shifted to the first edge reference point of the fourth group as the fifth straight line.

In an embodiment of the present invention, a center line of the line of printing words is used as a base, the second straight line is located outside of the third straight line, and the fifth straight line is located outside the fourth straight line.

In an embodiment of the present invention, after the step (i), further includes: (i1) a first zone distance between the second straight line and the third straight line, a second zone distance between the third straight line and the fourth straight line, and a third zone distance between the fourth straight line and the fifth straight line are calculated; (i2) the number of first reference points, the number of second reference points, the number of third reference points and the number of fourth reference points included in the first group, the second group, the third group and the fourth group are calculated; and (i3) the foregoing zone distances and number of reference points are compared so as to remove the aforementioned straight lines.

In an embodiment of the present invention, the step (i3) includes: if the first zone distance is smaller than a base value and the number of first reference points is greater than the number of second reference points, the third straight line is removed; if the third zone distance is smaller than base value and the number of fourth reference points is greater than the number of third reference point, the fourth straight line is removed.

In an embodiment of the present invention, after the step (j), further includes:

(k) the number of first connected components between the second straight line and the third straight line and the number of second connected components between the fourth straight line and the fifth straight line are calculated; (l) if the number of first connected components is greater than the number of second connected components, then the line printing words is determined to be standing upright; conversely, (m) if the number of first connected components is smaller than the number of second connected components, then the line of printing words is determined to be inverted. In an embodiment of the present invention, the first edge and the second edge are the upper edge and the lower edge of the printing characters or vice versa. Moreover, the first edge reference point and the second edge reference point of each printing character include either the central point or the end point of the first edge and the second edge of each printing character.

In an embodiment of the present invention, the group converging algorithm includes a K-Mean algorithm.

In the present invention, an asymptote of an upper edge or a lower edge of a printing word line is obtained. Then, two typographical lines of the other edge of the printing word line are obtained according to the asymptote. Two typographical lines of the present edge of the line of printing words are obtained based on the previously obtained typographical lines. Finally, the relations of these typographical lines and edge reference points of the line of printing words are used for removing useless typographical lines. Therefore, the typographical lines obtained by the present invention can provide the means of recognizing word direction, large or small character writing, and punctuation marks, so as to increase the efficiency and accuracy of character recognition.

In order to make the aforementioned and other objects, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
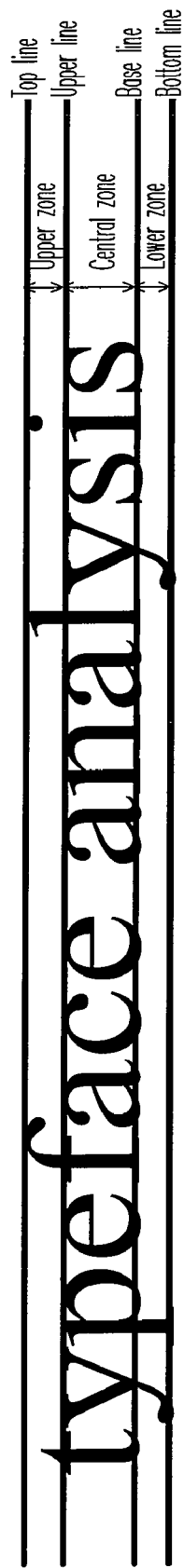
FIG. 1 is a diagram showing typographical lines according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

In general, when writing an essay in the English language, the writing usually follows a definite trace so as to adjust or arrange the size and location of the written characters according to their shape. These hidden 'reference lines' are similar to those four straight lines printed on a writing notebook when we first learn how to write in English. As long as the learner writes with care on these straight lines, a tidy and clear passage can be written. Similarly, the words in the English language that are printed on a piece of paper also use these reference lines as guidelines. These reference lines are the so-called typographical lines in the present invention.

FIG. 1 is a diagram showing typographical lines according to an embodiment of the present invention. As shown in FIG. 1, four typographical lines are defined with reference to the shape of each printing character in the line of printing words "typeface analysis". According to their locations, these typographical lines can be divided into a top line, an upper line, a base line and a bottom line. The areas between these typographical lines can be divided into an upper zone, a central zone and a lower zone. It should be noted that each printing character in FIG. 1 might be regarded as having a plurality of connected components (CC). These connected components are called a CC group.

In general, an image including all the words and graphs in a document is obtained after the document is scanned. At this time, all possible CC groups of the images can be found by using the graph/text separation technique. However, these CC groups can be printing characters or noise. Because these noise or small CC groups such as punctuation marks are useless in the subsequent step of generating typographical lines, the present invention includes a step of filtering away CC groups in the scanned image that do not possibly belong to one of the alphabets.

Figure 2:
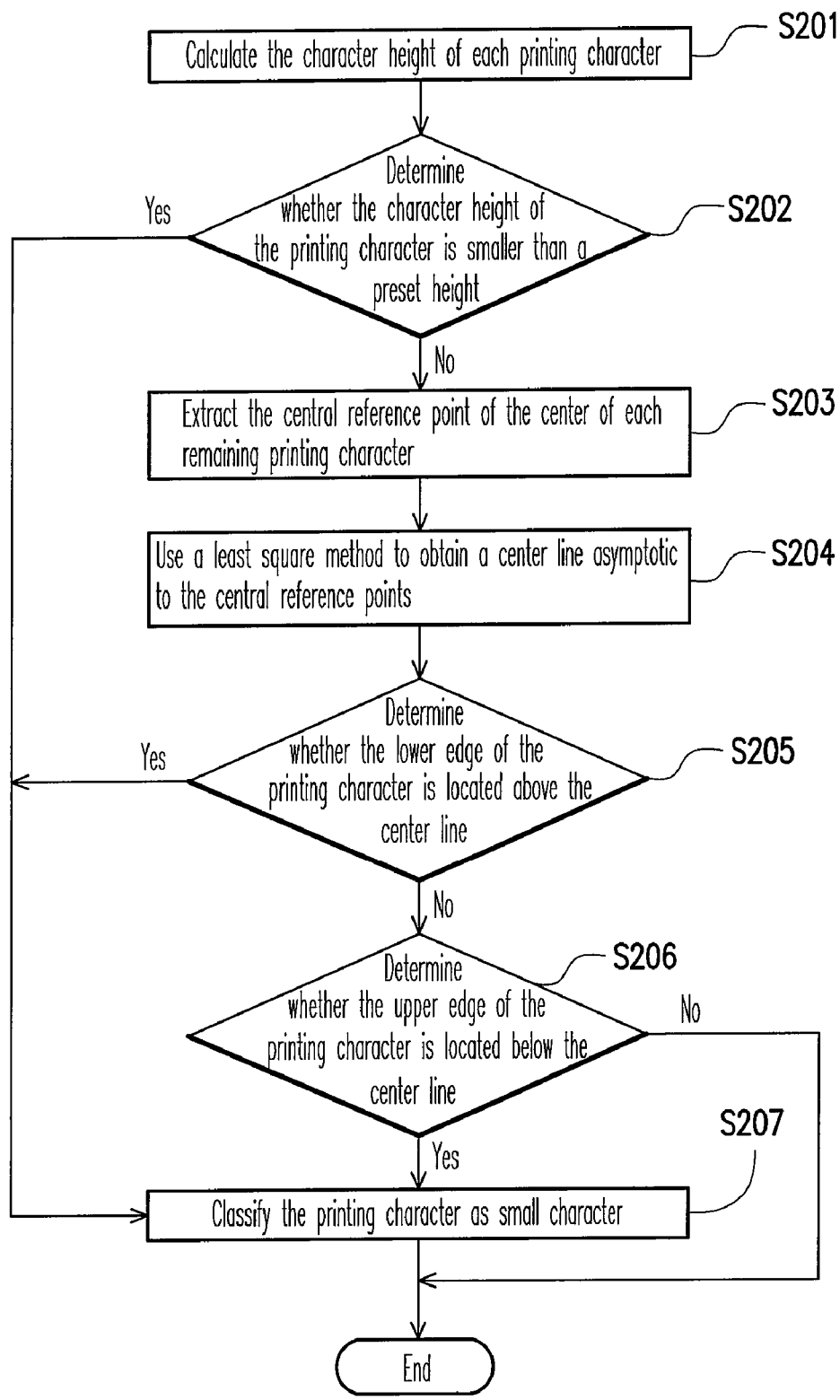
FIG. 2 is a flow diagram showing a method for determining small characters according to an embodiment of the present invention.

FIG. 2 is a flow diagram showing a method for determining small characters according to an embodiment of the present invention. As shown in FIG. 2, the present embodiment scans a line of printing words for obtaining the smaller printing characters or printing characters with large offset. After removing these printing characters, the accuracy of determining of the typographical lines is increased.

First, each printing character in a scanned image is marked with an outer frame. This outer frame includes the upper, the lower, the left and the right edge of the printing character. At this time, character height of each printing character can be calculated according to these marked outer frames (step S201).

Next, the character heights of these printing characters are compared with a preset height so as to determine whether the character height of each printing character is smaller than the preset height (step S202). The preset height can be half of the mean of the character heights of all the printing characters, for example. However, the present invention is not intended to limit the scope of the preset height.

When the character height of a printing character is smaller than the preset height, this printing character is classified as a small character (step S207). After eliminating those printing characters with smaller character heights, a central reference point is extracted from each of the remaining printing characters (step S203). Next, a least square method is used to obtain a center line asymptotic to the central reference points (step S204) so that the sum of the distances of the central reference point of each printing character to the center line is the smallest.

After defining a center line, the center line can be used to determine whether any of the remaining printing characters are small characters. For example, the lower edge of the printing character is determined whether located above the center line (step S205). If that is true, then this printing character is classified as a small character (step S207). Otherwise, the upper edge of the printing character is determined whether located below the center line (step S206). If that is true, then the printing character is classified as a small character (step S207). More simply said, the purpose of the present embodiment is to obtain a printing character that does not pass through the center line. These printing characters can be noise or punctuation marks, which have an outward shape smaller than a real alphabet and are usually not printed on the center line. Accordingly, the present invention eliminates these small characters so that they are not listed as references for the subsequent generation of the typographical lines. As a result, the small characters are prevented from affecting the accuracy of subsequently generated typographical lines.

It should be noted that the main direction of the line of printing words could be recognized and adjusted according to the distribution of the CC groups in the scanned image prior to determining the small characters in the present embodiment. The main direction is the horizontal direction (that is, 0° or 180°) or the vertical direction (that is, 90° or 270°), for example. This step distinguishes whether the document is placed vertically or horizontally so that the direction for performing subsequent character recognition can be adjusted.

Figure 3:
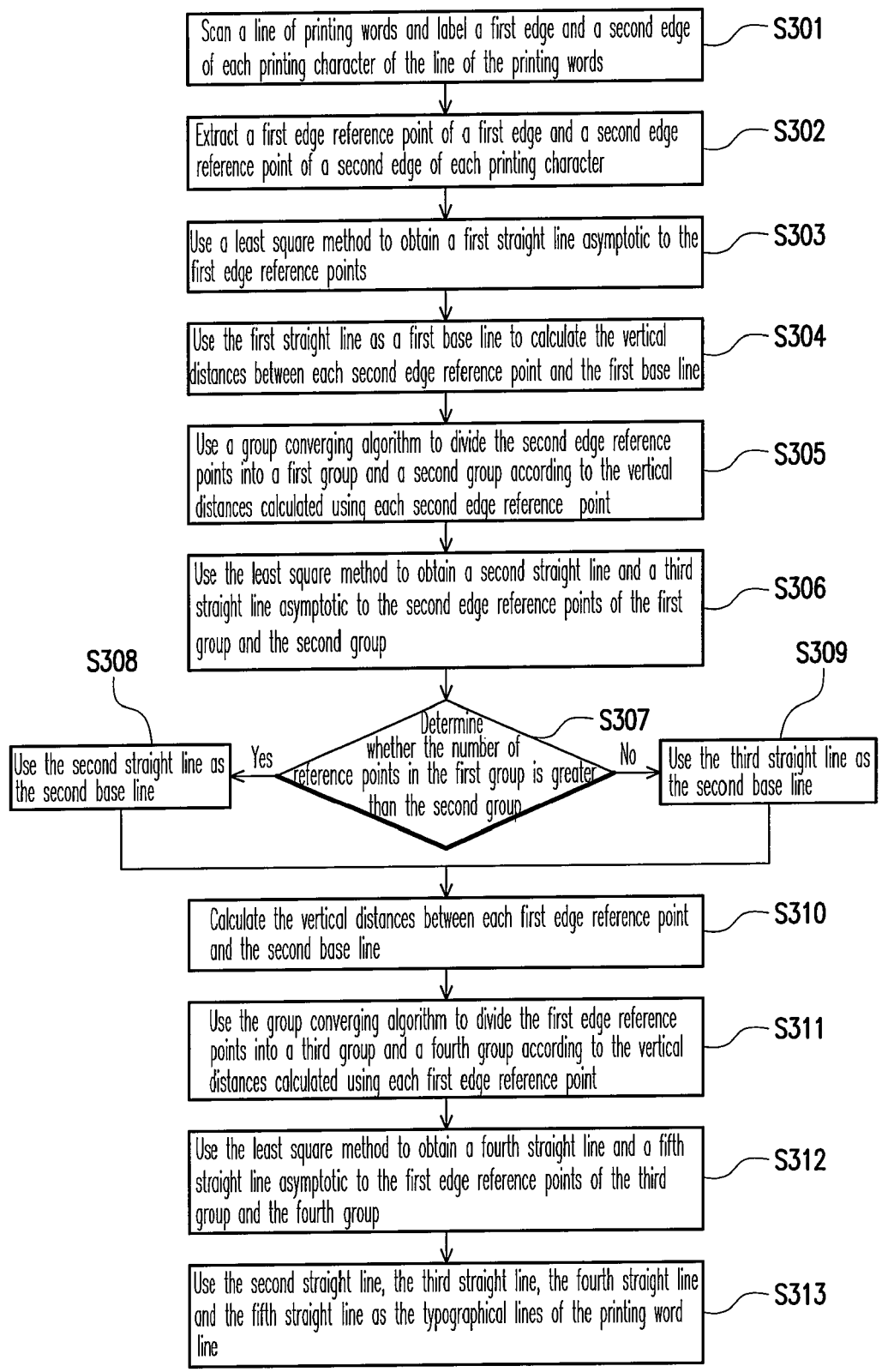
FIG. 3 is a method for generating typographical line according to an embodiment of the present invention.

After clearing small characters such as possible noise and punctuation marks, the main steps for generating the typographic lines of the present invention are performed. FIG. 3 is a method for generating typographical line according to an embodiment of the present invention. As shown in FIG. 3, the present embodiment is used to generate a plurality of typographical lines of a line of printing words. The line of printing words includes a plurality of printing characters. However, in actual applications, the present invention also includes the generation of typographical lines for recognizing multiple lines of printing words or an entire article and is not intended to limit the scope of the applications. In the following, the steps for generating typographical lines of one line of printing words are shown as an example.

First, after scanning a line of printing words, the present embodiment puts labels on a first edge and a second edge of each printing character in the line of printing words (step S301). The first edge and the second edge are, for example, the upper edge and the lower edge of a printing character or vice versa, and both conditions are applicable.

In the next step, a first edge reference point of the first edge and a second edge reference point of the second edge of each printing character are extracted (step S302). These first edge reference points and second edge reference points are, for example, the center points or the end points of the first edge and the second edge of each printing character. The coordinate values of these reference points in the image can be recorded in a memory array and can be subsequently taken out to perform a calculation when required.

Next, a least square method can be used to obtain a first straight line asymptotic to the first edge reference points (step S303). This first straight line can be regarded as a first base line for calculating the vertical distances between each second edge reference point and the first base line (step S304).

Thereafter, according to the vertical distances corresponding to the second edge reference points, a group converging method can be used to divide these second edge reference points into two groups, including a first group and a second group (step S305). The group converging algorithm is a K-Mean algorithm, for example. In this algorithm, each group has a group converging center, and the characteristic of the group converging center is that the sum of the distances from all the members of the group to the group converging center is the smallest. For example, if the data in the first group are 3, 3, 4, 3, 2, 3, the group converging center is 3 and the sum of the distances is |3−3|+|3−3|+|4−3|+|3−3|+|2−3|+|3−3|=2, which is the smallest value in this group. Similarly, if the data in the second group are 5, 5, 6, 5, 4, 5, the group converging center is 5 and the sum of the distances is |5−5|+|5−5|+|6−5|+|5−5|+|4−5|+|5−5|=2, which is also the smallest value in this group.

After dividing the second edge reference points into groups, the foregoing least square method can be used to obtain a second straight line and a third line asymptotic to the second edge reference points of the first group and the second group, respectively (step S306). In this step, if the number of reference points in both the first group and the second group is more than two, their corresponding asymptotes can be obtained respectively. However, if the number of reference points in one of the groups is only 1, other methods must be used to obtain the asymptote. If the number of reference points in the first group is 1, then the third straight line asymptotic to the second edge reference points of the second group is parallel-shifted to the only second edge reference point of the first group and this parallel straight line is used as the second straight line. Similarly, if the number of reference points in the second group is 1, then the second straight line asymptotic to the second edge reference points of the first group is parallel-shifted to the only second edge reference point of the second group and use this parallel straight line is used as the second straight.

In the next step, the number of reference points of the first group and the second group are compared to determine whether the number of reference points of the first group is greater than that of the second group (step S307). If the number of reference points of the first group is greater, then the second straight line is used as a second base line (step S308), otherwise, the third straight line is used as the second base line (step S309). Thereafter, the vertical distances between each first edge reference point and the second base line can be calculated (step S310).

According to the vertical distances, the foregoing group converging algorithm can be used to divide the first edge reference points into a third group and a fourth group (step S311). Similarly, the least square method is used to obtain a fourth straight line and a fifth straight line asymptotic to the first edge reference points of the third group and the fourth group, respectively (S312). Finally, the second straight line, the third straight line, the fourth straight line and the fifth straight line are used as the four typographical lines of the printing word lines (S313). These typographical lines can clearly partition the line of printing words into a top zone, a middle zone, and a bottom zone and can provide the means of recognizing word direction, large or small character writing, and punctuation marks so as to increase the efficiency and accuracy of character recognition. To provide a better understanding of the method of the present invention, an actual application is used as an example in the following to describe the steps for generating the typographical lines.

Figure 4:
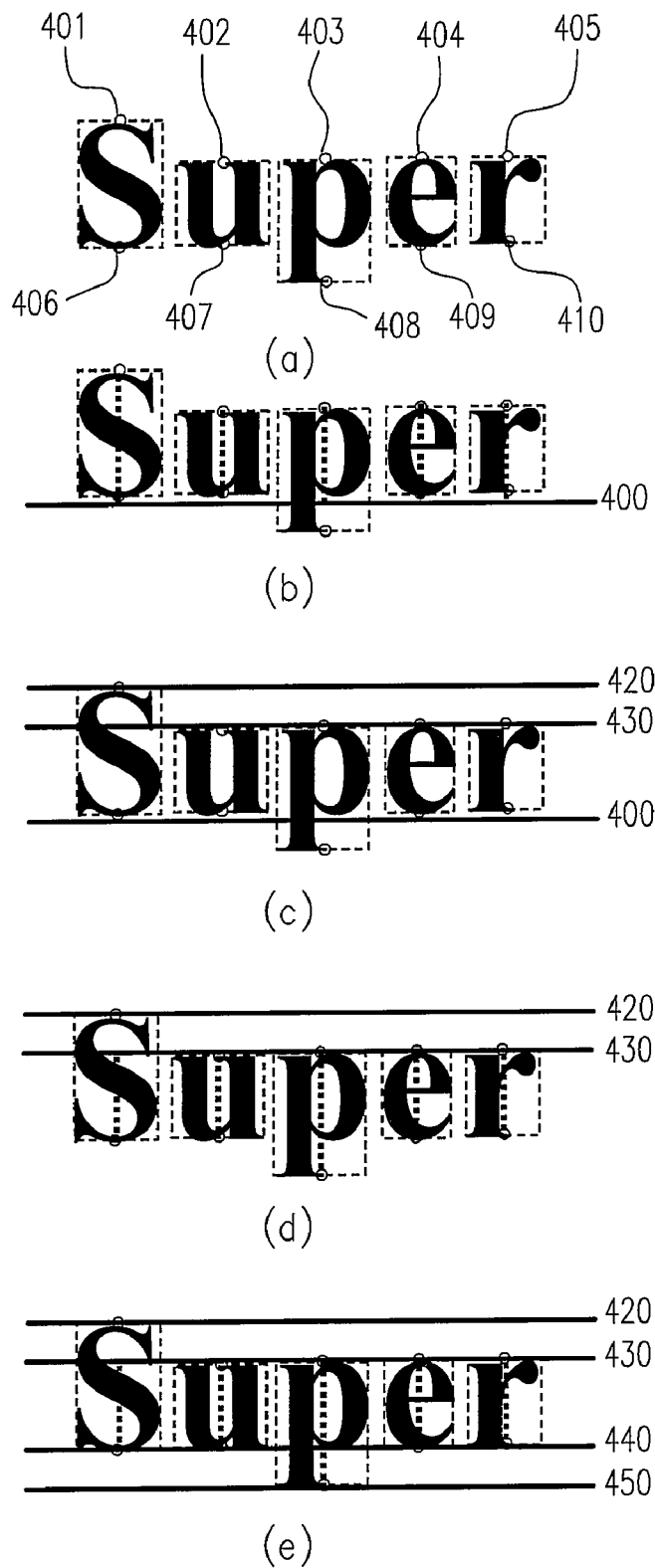
FIG. 4 shows an example that illustrates the method for generating typographical line according to an embodiment of the present invention.

FIG. 4 shows an example that illustrates the method for generating typographical line according to an embodiment of the present invention. As shown in FIG. 4, the present embodiment uses a simple lien of printing words "Super" as an example to show the steps for obtaining four corresponding typographical lines.

First, as shown in FIG. 4(a), the line of printing words "Super" is scanned to form an image. Thereafter, four edges of each printing character in "Super" are labeled, wherein the upper edge and the lower edge are used in subsequent steps. Next, the center points of the dash line at the lower edge of each printing character are taken as the first edge reference points 406~410. Similarly, the center points of the dash line at the upper edge of each printing character are taken as the second edge reference points 401~405.

Next, as shown in FIG. 4(b), after labeling the reference points, the first edge reference points 406~410 are taken and the least square method is used to obtain a first straight line 400 asymptotic to the first edge reference points 406~410. The first straight line 400 is used as the first base line to calculate the vertical distances between each of the second edge reference points 401~405 of the upper edges of the printing characters and the first base line.

Next, as shown in FIG. 4(c), according to the vertical distances corresponding to the second edge reference points 401~405, the group converging algorithm mentioned in the previous embodiment can be used to divide the second edge reference points 401~405 into a first group and a second group. Then, the least square method is used to obtain a second straight line 420 and a third straight line 430 asymptotic to the second edge reference points 401~405 of the first group and the second group, respectively. As shown in FIG. 4(c), the second edge reference point 401 forms a group while the second edge reference points 402~405 form another group. It should be noted that the group with the second edge reference point 401 includes only one reference point and cannot generate an asymptote. Therefore, an asymptote must be deduced from other asymptote. In other words, the third straight line 430 asymptotic to the second edge reference points 402~405 is first obtained and then the third straight line 430 is parallel-shifted to the second edge reference point 401. This straight line, which is parallel to the third straight line 430, is used as the second straight line 420.

Next, as shown in FIG. 4(d), the number of reference points between the first group and the second group is compared. Since the second group includes more reference points, the third straight line 430 is used as the second base line to calculate the vertical distances between each of the first edge reference points 406~410 and the second base line.

Next, as shown in FIG. 4(e), according to the vertical distances corresponding to the first edge reference points 406~410, the group converging algorithm is similarly used to divide the first edge reference points 406~410 into a third group and a fourth group. Then, the least square method is used to obtain a fourth straight line 440 and a fifth straight line 450 asymptotic to the first edge reference points 406~410 of the third group and the fourth group, respectively. Thus, the four typographical lines of the printing word line "Super" are the second straight line 420, the third straight line 430, the fourth straight line 440 and the fifth straight line 450.

It should be noted that the group converging centers after dividing into two groups might be very close to each other under some conditions (for example, all the printing characters in the line of printing words are large characters). Therefore, the asymptotes may be very close to each other or even may be overlapped so that it is meaningless to keep two separate lines. As a result, one of the lines can be chosen as a representative while the other line is removed.

Figure 5:
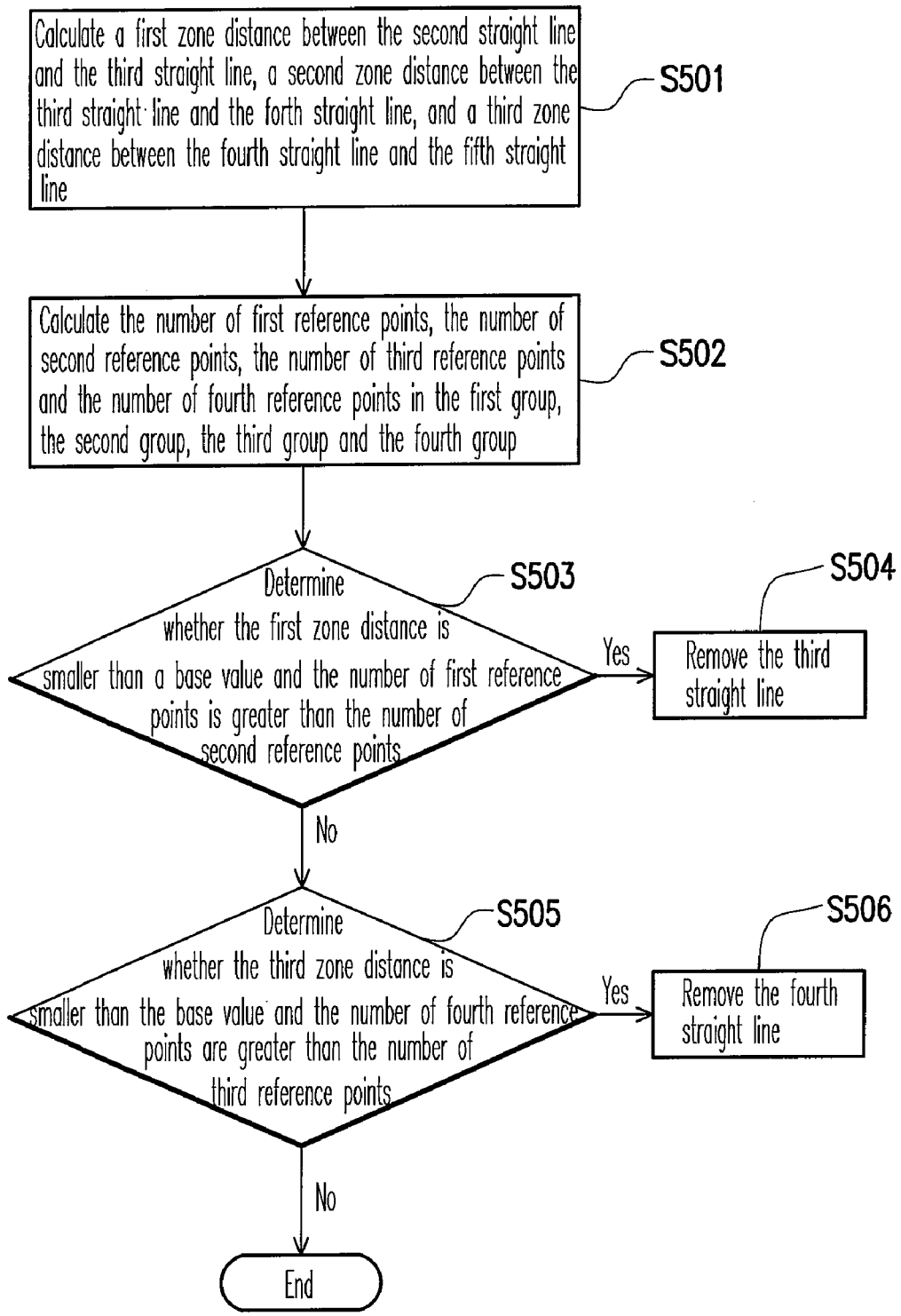
FIG. 5 is a flow diagram showing a method for removing typographical line according to an embodiment of the present invention.

FIG. 5 is a flow diagram showing a method for removing typographical line according to an embodiment of the present invention. As shown in FIG. 5, the present embodiment is a continuation of the foregoing method for generating typographical lines. After obtaining the four typographical lines of a printing word line, whether to remove one or two typographical lines can be determined according to the distances between the typographical lines and the number of reference points representing each typographical line. In other words, the possible number of typographical lines being generated can be two, three or four after the method for removing typographical line according to the present embodiment is used.

The present embodiment uses a center line of the line of printing words as a base and assumes that the second straight line is located outside the third straight line and the fifth straight line is located outside the fourth straight line. First, a first zone distance between the second straight line and the third straight line, a second zone distance between the third straight line and the fourth straight line, and a third zone distance between the fourth straight line and the fifth straight line are calculated (step S501). The method of calculating these zone distances includes, for example, taking the shortest distance between two straight lines. The line segment of these two straight lines only stop at the left and right end of the printing word lines so that the lines will not overlap even when the two straight lines are not parallel and a smallest value can always be found. Obviously, the present embodiment is not limited to this method. The user can also use the distance between the center points of the two straight lines as the zone distance.

In the next step, the number of first reference points, the number of second reference points, the number of third reference points and the number of fourth reference points in the first group, the second group, the third group and the fourth group are calculated (step S502). After determining the zone distances and the number of reference points, the information can be used to determine whether to remove the aforementioned straight lines.

First, whether the first zone distance is smaller than a base value and the number of first reference points is greater than the number of second reference points is determined (step S503). If that is true, then the second straight line is close to the third straight line and the second straight line outside the third straight line passes through more reference points. Therefore, the third straight line can be changed to the second straight line and the third straight line can be regarded as being removed (step S504). Otherwise, whether the third zone distance is smaller than the base value and the number of fourth reference points are greater than the number of third reference points is determined (step S505). If that is true, then the fourth straight line is close to the fifth straight line and the fifth straight line outside the fourth straight line passes through more reference points. Therefore, the fourth straight line can be changed to the fifth straight line and the fourth straight line can be regarded as being removed (step S506). The base value can be 0.4 times the second zone (the central zone) distance, for example, but its range is not limited in the present invention.

After performing the steps for generating and removing typographical line, two, three or four typographical lines are obtained. These typographical lines can be used for recognizing word direction, large or small character writing, and punctuation marks. In the following, only the recognition of word direction is described with an example.

Figure 6:
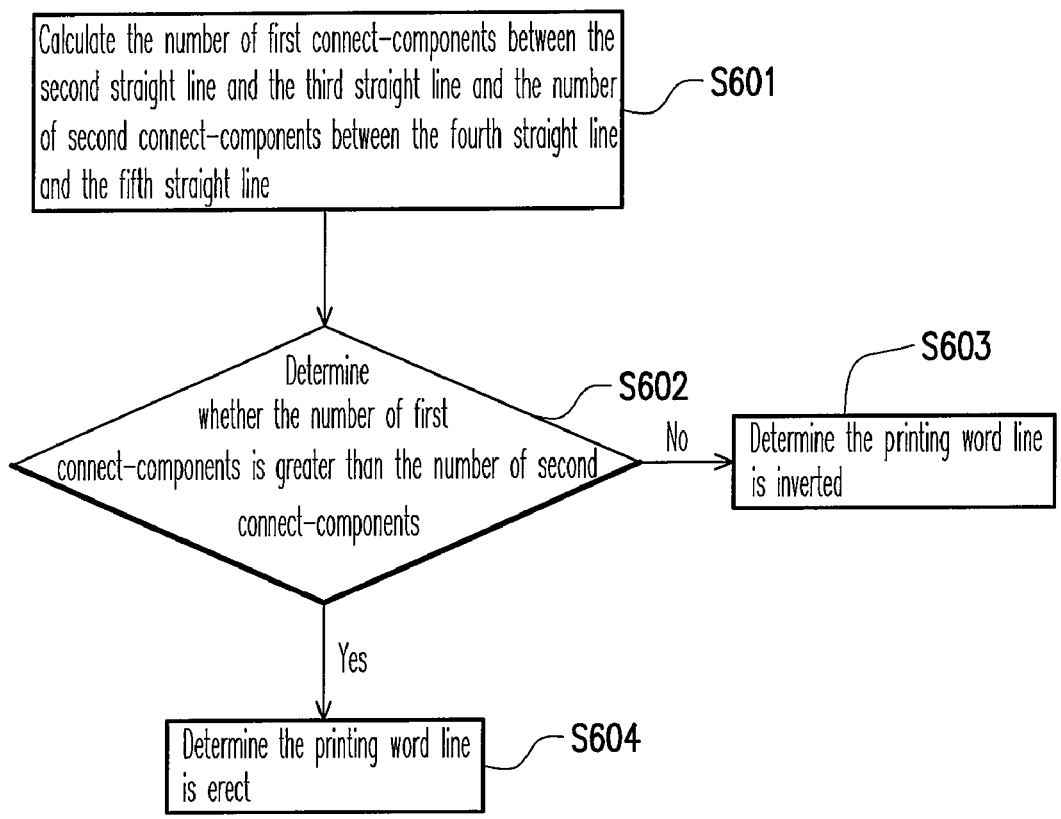
FIG. 6 is a flow diagram showing a method for recognizing word direction according to an embodiment of the present invention.

FIG. 6 is a flow diagram showing a method for recognizing word direction according to an embodiment of the present invention. As shown in FIG. 6, the present embodiment is a continuation of the foregoing method for generating typographical line and used for determining whether the scanned line of printing words is erect or inverted.

In the present embodiment, it is also assumed that the second straight line is located outside the third straight line and the fifth straight line is located outside the fourth straight line. First, the number of first connected components between the second straight line and the third straight line and the number of second connected components between the fourth straight line and the fifth straight line are calculated (step S601).

Next, whether the number of first connected components is greater than the number of second connected components is determined (step S602). It that is true, the line of printing words is determined to be erect (step S603). Conversely, the line of printing words is determined to be inverted (step S604).

In summary, the method for generating typographical line in the present invention has at least the following advantages:

1. Accurate typographical lines can be obtained. Therefore, the angle of the document can be analyzed for angle calibration so as to increase efficiency and accuracy of the subsequent document processing steps.

2. There is no need to calculate the amount of projection of word images so that noise interference is effectively reduced.

3. Different number of typographical lines can be obtained according to the characteristics of the words. Furthermore, there is no need for every two typographical lines to be parallel. As a result, the warp or size variation of the line of printing words can be suitably adjusted.

4. By making a statistics of the number of connected components in the upper and lower zones, whether the printing word line is erect or inverted can be easily determined.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for generating typographical line adapted to generating a plurality of typographical lines of a line of printing words in an image, wherein the line of printing words comprises a plurality of printing characters, the method comprising:

using an optical character recognition device to perform the steps of
(a) obtaining the image comprising the printing words;
(b) scanning the line of printing words and labeling a first edge and a second edge of each printing character in the line of printing words;
(c) extracting a first edge reference point of the first edge and a second edge reference point of the second edge of each of the printing characters, respectively;
(d) using a least square method to obtain a first straight line asymptotic to the first edge reference points;
(e) using the first straight line as a first base line to calculate a vertical distance between each of the second edge reference points and the first base line;
(f) using a group converging algorithm to divide the second edge reference points into a first group and a second group according to the vertical distances;
(g) using the least square method to obtain a second straight line and a third straight line asymptotic to the first group and the second group of the second edge reference points, respectively;
(h) using the second straight line or the third straight line obtained from corresponding first group or second group that has the most reference points as a second base line to calculate a vertical distance between each of the first edge reference point and the second base line;
(i) using the group converging algorithm to divide the first edge reference points into a third group and a fourth group according to the vertical distances;

(j) using the least square method to obtain a fourth straight line and a fifth straight line asymptotic to the first edge reference points of the third group and the fourth group, respectively; and (k) using the second straight line, the third straight line, the fourth straight line and the fifth straight line as the typographical lines of the printing word line.

2. The method for generating typographical line according to claim 1, wherein, after the step (b), further comprising:
(b1) recognizing and adjusting a main direction of the line of printing words.

3. The method for generating typographical line according to claim 2, wherein the main direction comprises either a horizontal direction or a vertical direction.

4. The method of generating typographical line according to claim 1, wherein, after the step (b), further comprising:
(b2) calculating a character height of each of the printing characters;
(b3) comparing the character height of each of the printing characters with a preset height and classifying those printing characters having a character height smaller than the preset height as smaller characters.

5. The method of generating typographical line according to claim 4, wherein, after the step (b3), further comprising:
(b4) extracting a central reference point from the center of each of the remaining printing characters;
(b5) using the least square method to obtain a center line asymptotic to the central reference points;
(b6) determining whether a lower edge of each of the printing characters is located above the center line and classifying the printing characters having the lower edge above the center line as small characters; and
(b7) determining whether an upper edge of each of the printing characters is located below the center line and classifying the printing characters having the upper edge below the center line as small characters.

6. The method of generating typographical line according to claim 5, wherein the small characters are not listed as references for generating the typographical lines.

7. The method of generating typographical line according to claim 1, wherein the step (g) comprises:
determining whether the number of second edge reference points in the first group or the second group is 1;
if the number of the second edge reference points in the first group is 1, then the third straight line asymptotic to the second edge reference points of the second group is parallel-shifted to the second reference point of the first group to serve as the second straight line; and
if the number of the second edge reference points in the second group is 1, then the second straight line asymptotic to the second edge reference points of the first group is parallel-shifted to the second reference point of the second group to serve as the third straight line.

8. The method of generating typographical line according to claim 1, wherein the step (j) comprises:
determining whether the number of first edge reference points in the third group or the fourth group is 1;
if the number of the first edge reference points in the third group is 1, then the fifth straight line asymptotic to the first edge reference points of the fourth group is parallel-shifted to the first reference point of the third group to serve as the fourth straight line; and
if the number of the first edge reference points in the fourth group is 1, then the fourth straight line asymptotic to the first edge reference points of the third group is parallel-shifted to the first reference point of the fourth group to serve as the fifth straight line.

9. The method of generating typographical line according to claim 1, wherein a center line of the line of printing words is used as a base, the second straight line is located outside the third straight line and the fifth straight line is located outside the fourth straight line.

10. The method of generating typographical line according to claim 9, wherein after the step (j) further comprising:
(j1) calculating a first zone distance between the second straight line and the third straight line, a second zone distance between the third straight line and the fourth straight line, and a third zone distance between the fourth straight line and the fifth straight line;
(j2) calculating the number of first reference points, the number of second reference points, the number of third reference points and the number of fourth reference points in the first group, the second group, the third group and the fourth group, respectively; and
(j3) if the first zone distance is smaller than a base value and the number of first reference points is greater than the number of second reference points, then the third straight line is removed.

11. The method of generating typographical line according to claim 9, wherein after the step (j) further comprising:
(j1) calculating a first zone distance between the second straight line and the third straight line, a second zone distance between the third straight line and the fourth straight line, and a third zone distance between the fourth straight line and the fifth straight line;
(j2) calculating the number of first reference points the number of second reference points, the number of third reference points and the number of fourth reference points in the first group, the second group, the third group and the fourth group, respectively; and
(j3) if the third zone distance is smaller than a base value and the number of fourth reference point is greater than the number of third reference points, then the fourth straight line is removed.

12. The method of generating typographical line according to claim 1, wherein, after the step (k), further comprising:
(l) calculating a number of first connected components between the second straight line and the third straight line and a number of second connected components between the fourth straight line and the fifth straight line;
(m) if the number of first connected components is greater than the number of second connected components, then the line of printing words is determined to be erect; and
(n) if the number of first connected components is smaller than the number of second connected components, then the line of printing words is determined to be inverted.

13. The method of generating typographical line according to claim 1, wherein the first edge and the second edge are an upper edge and a lower edge of the printing characters or the opposite.

14. The method of generating typographical line according to claim 1, wherein the first edge reference point and the second edge reference point of each of the printing characters comprise either the center point or end point of the first edge and the second edge of each of the printing characters.

15. The method of generating typographical line according to claim 1, wherein the group converging algorithm comprises a K-Mean algorithm.

* * * * *